United States Patent
Vesely et al.

(10) Patent No.: US 9,711,055 B2
(45) Date of Patent: Jul. 18, 2017

(54) FLIGHT MANAGEMENT MODE TRANSITIONING FOR AIRCRAFT TRAJECTORY MANAGEMENT

(71) Applicant: Honeywell International Inc., Morristown, NJ (US)

(72) Inventors: Petr Vesely, Horni Marsov (CZ); Petr Krupansky, Veverska Bityska (CZ); Pavel Klang, Brno (CZ); Jaroslav Jonak, Brno (CZ); Michal Polansky, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 16 days.

(21) Appl. No.: 14/733,555

(22) Filed: Jun. 8, 2015

(65) Prior Publication Data
US 2016/0358481 A1   Dec. 8, 2016

(51) Int. Cl.
*G08G 5/02* (2006.01)
*G08G 5/04* (2006.01)
(Continued)

(52) U.S. Cl.
CPC ............ *G08G 5/02* (2013.01); *G01C 23/005* (2013.01); *G01S 13/9303* (2013.01);
(Continued)

(58) Field of Classification Search
CPC ........ G08G 5/0039; G08G 5/02; G08G 5/045; G08G 5/0021; G05D 1/0676; G05D 1/104;
(Continued)

(56) References Cited

U.S. PATENT DOCUMENTS

| | | | | |
|---|---|---|---|---|
| 5,475,594 A | * | 12/1995 | Oder | G08G 5/0021 701/14 |
| 6,393,358 B1 | * | 5/2002 | Erzberger | G08G 5/0043 701/10 |

(Continued)

FOREIGN PATENT DOCUMENTS

| | | | | |
|---|---|---|---|---|
| EP | 2555179 A2 | 2/2013 | | |
| EP | 2804066 A1 | * 11/2014 | | G08G 5/0039 |
| WO | 2006135916 A1 | 12/2006 | | |

OTHER PUBLICATIONS

Itoh et al., "An Overview of Airborne Time-Spacing Research in the JADE Program," ATACCS'2012, Research Papers, May 29-31, 2012, 11 pp.

(Continued)

*Primary Examiner* — Dale W Hilgendorf
(74) *Attorney, Agent, or Firm* — Shumaker & Sieffert, P.A.

(57) ABSTRACT

This disclosure is directed to systems and methods for smart transitioning between aircraft trajectory management modes. In one example, a system is configured to track a speed of a target aircraft in flight ahead of an own aircraft on which the system is positioned. The system is further configured to determine whether the target aircraft has maintained a rate of change in speed within a selected range of variation in change of speed, for a selected period of time. The system is further configured to enable an activation of a merging trajectory management mode of the own aircraft in response to determining that the own aircraft is in a trajectory management mode transition airspace and that the target aircraft has maintained the rate of change in speed within the selected range of variation in change of speed, for the selected period of time.

20 Claims, 6 Drawing Sheets

(51) Int. Cl.
  *G08G 5/00* (2006.01)
  *G01S 13/93* (2006.01)
  *G01S 13/91* (2006.01)
  *G05D 1/10* (2006.01)
  *G05D 1/06* (2006.01)
  *G01C 23/00* (2006.01)

(52) U.S. Cl.
  CPC ........... *G05D 1/0676* (2013.01); *G05D 1/104* (2013.01); *G08G 5/0008* (2013.01); *G08G 5/0021* (2013.01); *G08G 5/0039* (2013.01); *G08G 5/045* (2013.01); *G01S 13/913* (2013.01); *G08G 5/0052* (2013.01); *G08G 5/025* (2013.01)

(58) Field of Classification Search
  CPC ........ G05D 1/10; G05D 1/101; G01C 23/005; G01S 13/913; G01S 13/9303
  See application file for complete search history.

(56) References Cited

U.S. PATENT DOCUMENTS

| | | | | |
|---|---|---|---|---|
| 6,587,757 | B2* | 7/2003 | Sainthuile | G05D 1/104 701/8 |
| 7,412,324 | B1* | 8/2008 | Bagge | G08G 5/0021 701/120 |
| 7,437,223 | B2* | 10/2008 | Randazzo | G01C 23/005 701/4 |
| 7,650,232 | B1* | 1/2010 | Paielli | G08G 5/0043 701/528 |
| 7,747,360 | B2* | 6/2010 | Canu-Chiesa | G08G 5/0021 701/3 |
| 7,912,593 | B2 | 3/2011 | Ridenour | |
| 8,108,088 | B2* | 1/2012 | Closse | G05D 1/0676 701/16 |
| 8,112,187 | B2* | 2/2012 | Coulmeau | G08G 5/0039 701/7 |
| 8,386,158 | B2 | 2/2013 | Blanchon et al. | |
| 8,554,458 | B2* | 10/2013 | Sawhill | G08G 5/0039 701/120 |
| 8,560,148 | B2* | 10/2013 | Torres | G08G 5/0039 701/3 |
| 8,577,587 | B2 | 11/2013 | Weitz et al. | |
| 8,594,917 | B2* | 11/2013 | Sawhill | G08G 5/0039 701/122 |
| 8,954,262 | B2* | 2/2015 | Sawhill | G08G 5/0039 701/122 |
| 8,965,672 | B2* | 2/2015 | Sawhill | G08G 5/0039 701/120 |
| 2008/0243314 | A1 | 10/2008 | Ridenour | |
| 2009/0195436 | A1 | 8/2009 | Ridenour et al. | |
| 2012/0245835 | A1* | 9/2012 | Weitz | G08G 5/0043 701/120 |
| 2013/0261945 | A1 | 10/2013 | Marcy et al. | |

OTHER PUBLICATIONS

Swieringa et al., "An Evaluation of a Flight Deck Interval Management Algorithm including Delayed Target Trajectories," American Institute of Aeronautics and Astronautics, 14th AIAA Aviation Technology, Integration, and Operations Conference, Jun. 16-20, 2014, 11 pp.

Mohleji et al., "Modeling ADS-B Position and Velocity Errors for Airborne Merging and Spacing in Interval Management Application," The Mitre Corporation, Sep. 2010, 20 pp.

Westphal et al., "Operational Human-In-The-Loop Integration of 4D Arrival Guidance," 28th International Congress of the Aeronautical Sciences, ICAS 2012, Sep. 23-28, 2012, 9 pp.

Wichman, "Green Approaches: 4D-Trajectory Enabled Continuous Descent Approaches," Smiths Aerospace, FAA New Technologies Workshop III, Jan. 9-10, 2007, 27 pp.

Mutuel et al., "Initial 4D Trajectory Management Concept Evaluation," Tenth USA/Europe Air Traffic Management Research and Development Seminar (ATM2013), Jun. 10-13, 2013, 8 pp.

Extended Search Report from counterpart European Application No. 16171841.6, dated Mar. 10, 2017, 12 pp.

* cited by examiner

FLIGHT MANAGEMENT MODE TRANSITIONING FOR AIRCRAFT TRAJECTORY MANAGEMENT

This disclosure relates to aviation.

BACKGROUND

Air traffic control systems track positions and velocity of aircraft and help manage aircraft trajectories. Air traffic control has traditionally been based on radar surveillance, supplemented more recently with cooperative radio surveillance techniques, such as automatic dependent surveillance-broadcast (ADS-B). An aircraft may determine its own position, such as via a Global Navigation Satellite System (GNSS), and periodically broadcast its position via a radio frequency, which may be read by ground stations and other aircraft. Aircraft position data may be provided to a variety of other applications that serve functions such as traffic situational awareness, traffic alert, and collision avoidance, for example. Air traffic control may help manage and coordinate trajectories of aircraft on approach to an airport to ensure the aircraft are spaced at appropriate intervals.

SUMMARY

Various examples provided herein are generally directed to techniques, systems, devices, computer program products, and methods for smart transitioning between aircraft trajectory management modes. This may include transitioning from a first trajectory management mode for an aircraft to use while cruising between airports and without other aircraft in its proximate airspace ("cruise trajectory management mode" or "cruise mode"), to a second trajectory management mode for an aircraft to use while on approach to an airport and to merge with other air traffic into an aircraft queue to line up for spaced approach to landing ("merging trajectory management mode" or "merge mode"). In a particular example, this may include transitioning an aircraft from Initial Four-Dimension (I4D) trajectory management mode ("I4D mode") to Airborne Spacing-Flight Interval Management (ASPA-FIM) trajectory management mode ("ASPA-FIM mode"). A cruise mode such as I4D mode may involve managing trajectory, including speed and altitude, of an aircraft at cruise between airports. A merge mode such as ASPA-FIM mode may involve managing trajectory, including speed and altitude of an aircraft, as well as spacing apart from adjacent aircraft at their relative speeds and altitudes as the multiple aircraft merge into and fly together in a queue on approach for landing at an airport. Typical transitioning from cruise mode to merge mode, such as from I4D mode to ASPA-FIM mode, may induce inefficient speed changes, which may in some cases propagate in chain reactions among multiple aircraft on approach for landing. Techniques of this disclosure may reduce or resolve such inefficient speed changes among aircraft on approach to an airport and may instead promote efficient transitioning from a cruise mode without aircraft spacing requirements to a merge mode that has aircraft spacing requirements, as further described below.

In one example, a system is configured to track a speed of a target aircraft in flight ahead of an own aircraft on which the system is positioned. The system is further configured to determine whether the target aircraft has maintained a rate of change in speed within a selected range of variation in change of speed, for a selected period of time. The system is further configured to enable an activation of a merging trajectory management mode of the own aircraft in response to determining that the own aircraft is in a trajectory management mode transition airspace and that the target aircraft has maintained the rate of change in speed within the selected range of variation in change of speed, for the selected period of time.

In another example, a method includes tracking, by one or more processors, a speed of a target aircraft in flight ahead of an own aircraft on which the system is positioned. The method further includes determining, by the one or more processors, whether the target aircraft has maintained a rate of change in speed within a selected range of variation in change of speed, for a selected period of time. The method further includes enabling, by the one or more processors, an activation of a merging trajectory management mode of the own aircraft in response to determining that the own aircraft is in a trajectory management mode transition airspace and that the target aircraft has maintained the rate of change in speed within the selected range of variation in change of speed, for the selected period of time.

In another example, a non-transitory computer program product comprises executable instructions to cause one or more processors to track a speed of a target aircraft in flight ahead of an own aircraft on which the system is positioned. The computer program product further comprises executable instructions to cause the one or more processors to determine whether the target aircraft has maintained a rate of change in speed within a selected range of variation in change of speed, for a selected period of time. The computer program product further comprises executable instructions to cause the one or more processors to enable an activation of a merging trajectory management mode of the own aircraft in response to determining that the own aircraft is in a trajectory management mode transition airspace and that the target aircraft has maintained the rate of change in speed within the selected range of variation in change of speed, for the selected period of time.

The details of one or more examples are set forth in the accompanying drawings and the description below. Other features, objects, and advantages will be apparent from the description and drawings, and from the claims.

DETAILED DESCRIPTION

Figure 1:
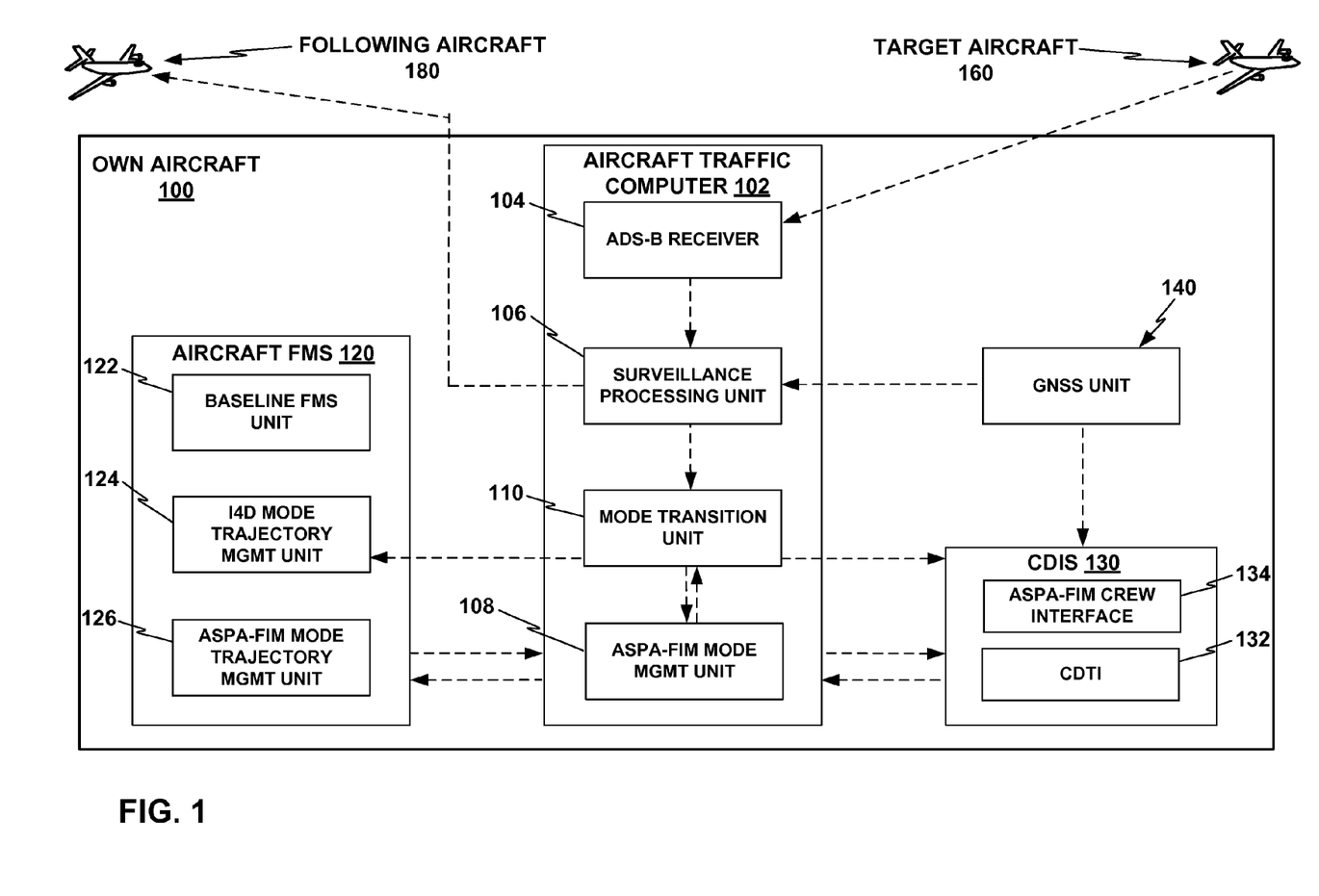
FIG. 1 shows a conceptual block diagram of an example own aircraft equipped with a traffic computer that incorporates an aircraft trajectory management mode transition unit in an example implementation of this disclosure.

FIG. 1 shows a conceptual block diagram of an example own aircraft (or ownship) 100 that includes a traffic computer 102 that incorporates an aircraft trajectory management mode transition unit 110 ("mode transition unit 110") in an example implementation of this disclosure. Mode transition unit 110 is configured to intelligently manage transitions from one trajectory management mode to another, such as managing transitions from a cruise trajectory management mode (cruise mode) to a merging trajectory management mode (merge mode) on approach to an airport. A cruise mode such as I4D mode may be for managing the trajectory of the our aircraft as own aircraft 100 cruises along the major portion of its flight in isolation from other air traffic, and may be directed to managing speed and altitude changes to promote time efficiency and fuel efficiency, for example. A merge mode such as ASPA-FIM mode may be directed to managing the trajectory of the own aircraft on approach to an airport, in proximity to multiple other aircraft, and merging into a queue formation with the other aircraft, with criteria for adequate spacing between aircraft in addition to criteria for speed and altitude, for example. In some examples, mode transition unit 110 may thus be implemented and referred to as a cruise to merge mode transition unit, or as an I4D to ASPA-FIM Smart Transition Algorithm (IASTA) unit. Mode transition unit 110 is further described below in an example implementation as an I4D to ASPA-FIM mode transition unit, with the understanding that analogous descriptions may apply to any of a variety of other implementation details.

Traffic computer 102 may be incorporated as part of the avionics on own aircraft 100 in various examples. In the example of FIG. 1, traffic computer 102 also includes an ADS-B receiver 104, a surveillance processing unit 106, and an ASPA-FIM mode management unit 108, in addition to mode transition unit 110. Own aircraft 100 may be behind target aircraft 160 on approach to an airport, such that own aircraft 100 may merge into a queue formation behind target aircraft 160. ADS-B receiver 104 may be coupled to one or more antennas and one or more radio transcievers. ADS-B receiver 104 may receive and process cooperative surveillance signals, e.g., ADS-B messages, from a transponder of target aircraft 160. The ADS-B messages may include indications of traffic state data for the target aircraft (including, e.g., speed of the target aircraft). ADS-B receiver 104 may communicate the received target aircraft state data to surveillance processing unit 106. In other examples, the cooperative surveillance messages may include automatic dependent surveillance-contract (ADS-C) messages or other types of cooperative surveillance signals, and mode transition unit 110 may be configured to track the speed of target aircraft 160 based on ADS-C messages or other types of cooperative surveillance signals received from target aircraft 160. In still other examples, aircraft 100 and mode transition unit 110 may track the speed of target aircraft 160 based on other techniques besides cooperative surveillance technologies.

Own aircraft 100 is also equipped with a Flight Management System (FMS) 120, a cockpit display/input system 130, and a Global Navigation Satellite System (GNSS) unit 140. FMS 120 includes a baseline FMS unit 122, an I4D trajectory management unit 124, and an ASPA-FIM trajectory management unit 126. FMS 120 may communicate flight plan information to traffic computer 102. Traffic computer 102 may communicate speed adjustments to FMS 120. Cockpit display/input system 130 includes a cockpit display of traffic information (CDTI) 132 and an ASPA-FIM crew interface 134. Cockpit display/input system 130 may receive and output information from Air Traffic Control (ATC). ASPA-FIM crew interface 134 may communicate ASPA-FIM clearance to traffic computer 102.

GNSS unit 140 may include a Global Positioning System (GPS) unit, potentially also including enhancements such as a Wide Area Augmentation System (WAAS) unit. GNSS unit 140 may communicate state data of own aircraft to other systems of own aircraft 100 including cockpit display/input system 130 and surveillance processing unit 106. Surveillance processing unit 106 may in turn generate cooperative surveillance messages, e.g., ADS-B messages, to be broadcast from own aircraft 100 via one or more antennas and one or more radio transcievers to which surveillance processing unit 106 may be coupled. The ADS-B messages transmitted from own aircraft 100 may be received, e.g., by an ADS-B receiver of a following aircraft 180 that is following behind aircraft 100, and merging into queue formation behind own aircraft 100, on approach to an airport.

Surveillance processing unit 106 may also communicate both target aircraft state data for one or more target aircraft, including representative target aircraft 160 (collectively, "air traffic state data"), and own aircraft state data, to both ASPA-FIM mode management unit 108 and mode transition unit 110. ASPA-FIM mode management unit 108 may detect when own aircraft 100 has physically entered a volume of airspace designated as an I4D to ASPA-FIM transition airspace ("transition airspace"), as further described below. In other examples generally, a merge mode management unit may detect when own aircraft 100 has entered an airspace designated as a cruise mode to merge mode transition airspace. ASPA-FIM mode management unit 108 may communicate the ASPA-FIM status of own aircraft 100, including an indication that own aircraft 100 is in the transition airspace, to mode transition unit 110.

Mode transition unit 110 may use the indication received from ASPA-FIM mode management unit 108 that aircraft 100 has entered the transition airspace as a prerequisite condition for enabling activation of ASPA-FIM mode. In some examples, mode transition unit 110 may apply this indication as one of two or more prerequisite conditions for enabling activation of ASPA-FIM mode. In some examples, mode transition unit 110 may respond to receiving the indication from ASPA-FIM mode management unit 108 that aircraft 100 has entered the transition airspace by then identifying target aircraft 160 as the closest forward aircraft and thus as the target aircraft to evaluate. Mode transition unit 110 may then evaluate the state data from target aircraft 160 and may evaluate the speed of target aircraft 160 over time. Mode transition unit 110 may evaluate the target aircraft state data in terms of a matrix of speed over time for target aircraft 160. Mode transition unit 110 may begin evaluating the target aircraft speed matrix data in response to receiving the indication that aircraft 100 is in the transition airspace.

Mode transition unit 110 may evaluate the target aircraft speed matrix data from target aircraft 160 to evaluate whether the speed matrix qualifies as indicating a stable rate of change in speed of target aircraft 160 over a selected period of time, according to target aircraft speed change stability criteria, as further described below, that mode transition unit 110 may apply. Mode transition unit 110 may apply a qualifying determination that target aircraft 160 maintains stable rate of change in speed (e.g., stable deceleration or relatively constant speed) over time according to the target aircraft speed change stability criteria, based on the speed matrix data, as another prerequisite condition for enabling activation of ASPA-FIM mode (or other merge mode). Mode transition unit 110 may thus enable activation of ASPA-FIM mode after determining both that own aircraft 100 has entered the mode transition airspace and that target aircraft 160 has maintained a stable rate of change in speed over the selected period of time. Mode transition unit 110 may communicate an output to ASPA-FIM mode management unit 108 to enable the activation of ASPA-FIM mode. Mode transition unit 110 may also communicate an output to I4D mode trajectory management unit 124 to deactivate I4D mode.

In some examples, mode transition unit 110 may also already have begun tracking the speed matrix data for target aircraft 160 prior to receiving the indication that own aircraft 100 is in the transition airspace. In these examples, mode transition unit 110 may still use both the indication that own aircraft 100 has entered the transition airspace, and the qualification of the speed matrix data to determine the stable rate of change in speed of target aircraft 160, as prerequisite conditions for enabling the activation of ASPA-FIM mode. The designation of transition airspace, the criteria for stable rate of change in speed, and further elements of the operation and effects of mode transition unit 110 are further described below with reference to the subsequent figures.

Figure 2:
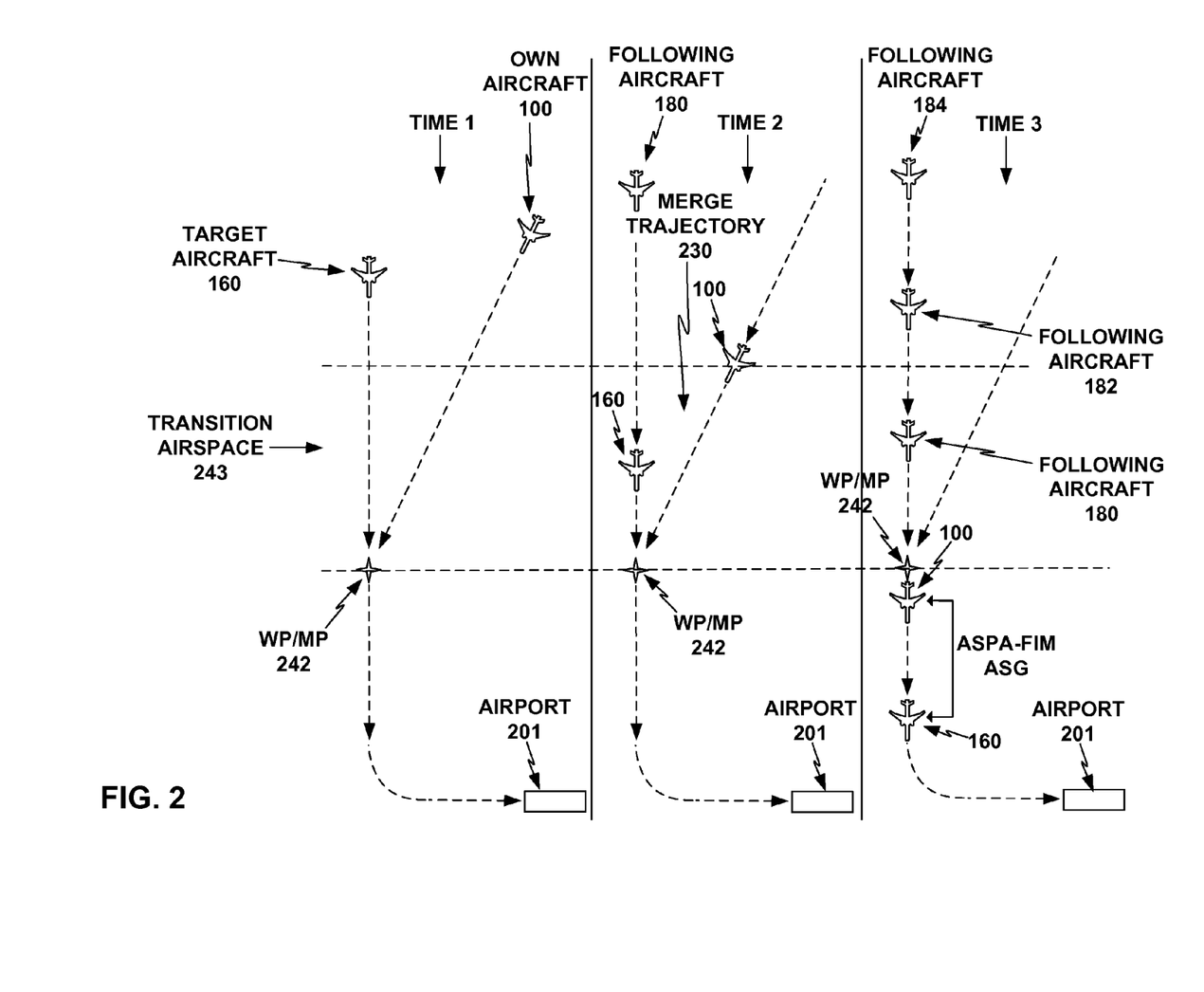
FIG. 2 shows a diagram of the flight paths of a merging aircraft queue including a target aircraft and an own aircraft at three successive points in time as they merge into a queue on approach to an airport 201 for landing, in an example implementation of this disclosure.

FIG. 2 shows a diagram of the flight paths of a merging aircraft queue including target aircraft 160 and own aircraft 100 at three successive points in time as they merge into a queue on approach to an airport 201 for landing. Target aircraft 160 and own aircraft 100 may also be followed by additional following aircraft, such as following aircraft 180 and subsequent following aircraft 182 and 184, which may also merge into following positions in the same queue behind own aircraft 100. FIG. 2 shows an example in which target aircraft 160 and own aircraft 100 are both, at Time 1, on a trajectory heading toward a combined cruise mode waypoint (WP) and merge mode merge point (MP) 242 ("WP/MP 242").

The cruise mode waypoint may be an I4D Required Time of Arrival (RTA) waypoint, wherein I4D trajectory management unit 124 onboard own aircraft 100 manages the trajectory of own aircraft 100 during the cruising phase of its flight to enhance time efficiency and fuel efficiency under the constraint of finishing its cruise phase and arriving at the RTA waypoint at a selected position at a selected time, preparatory to landing at the destination airport 201. The merge mode merge point may be an ASPA-FIM merge point, wherein each aircraft is intended to cross the ASPA-FIM merge point heading toward landing a airport 201 at an appropriate speed determined by ASPA-FIM trajectory management unit 126.

In cases where the cruise mode RTA waypoint is separate from the merge mode merge point, each aircraft may first head to its own RTA waypoint, then fly from the waypoint through the uncoordinated interim airspace to the merge point. However, this use of an uncoordinated interim airspace separating the cruise mode airspace from the merge mode airspace may interfere with coordinated flight and fuel efficiency and may reduce the flexibility of the airspace in the vicinity of the airport.

Instead, in this example, I4D trajectory management unit 124 and ASPA-FIM trajectory management unit 126 onboard own aircraft 100 are configured to designate the I4D RTA waypoint and the ASPA-FIM merge point at the identical or overlapping position of WP/MP 242. Target aircraft 160 and additional aircraft forward of and following own aircraft 100 may also have flight management systems (FMSs) equipped with analogous cruise mode trajectory management units and merge mode trajectory management units that also designate WP/MP 242 as their overlapping cruise mode waypoints and merge mode merge points. Thus, various aircraft including own aircraft 100 and target aircraft 160 may all head along different cruise trajectories aimed toward the mutual aircraft approach queue formation merge point of WP/MP 242.

The use of I4D and ASPA-FIM in a unified flight procedure for approach to and arrival at an airport may provide benefits such as a decreased need for radar vectoring, decreased workload for flight crews and Air Traffic Controllers (ATCo), improved time efficiency and fuel efficiency of aircraft trajectories, and optimized use of airspace. The use of overlapping cruise mode and merge mode WP/MP 242 may also eliminate an interim airspace between the designated cruise mode airspace and the designated merge mode airspace, such that instead, the designated cruise mode airspace and the designated merge mode airspace are directly adjacent to each other. A portion of the cruise mode airspace leading up to and within a selected distance of WP/MP 242 may then be designated a transition airspace 243. Transition airspace 243 may be designated for a certain horizontal distance of WP/MP 242.

While this use of WP/MP 242 and transition airspace 243 may eliminate the inefficiency and inflexibility involved with an interim airspace in which neither a cruise mode nor a merge mode are applied, the use of WP/MP 242 and transition airspace 243 may also give rise to queue instability conditions that induce inefficient speed changes such as sudden oscillations between acceleration and deceleration, which in some cases may propagate in chain reactions of such inefficient speed changes among multiple aircraft merging into a queue, as indicated above. Mode transition unit 110 may reduce or eliminate such inefficient speed changes as the various aircraft transition from cruise mode to merge mode and merge together into a queue, as further described below. Mode transition unit 110 may thereby enhance fuel efficiency and passenger comfort, among other advantages.

FIG. 2 shows an example of how such inefficient speed changes may be induced. At Time 1, target aircraft 160 and own aircraft 100 are both flying on a trajectory heading toward WP/MP 242. At Time 2, own aircraft 100 crosses the boundary into the transition airspace 243. ASPA-FIM mode management unit 108 onboard own aircraft 100 may determine that own aircraft 100 has entered the transition airspace 243, and may begin applying transitional ASPA-FIM trajectory management requirements, which may include spacing requirements for how much distance own aircraft 100 should maintain behind target aircraft 160. The ASPA-FIM spacing requirement may be known as an Assigned Spacing Goal (ASG). The ASPA-FIM trajectory management requirements may seek to maintain own aircraft 100 at the ASG behind target aircraft 160 such that own aircraft 100 is at a safe distance away from target aircraft 160, but also no further away than necessary, to maintain a high flow rate of queued aircraft on approach for landing. ASPA-FIM mode management unit 108 may also communicate the determination of entering transition airspace 243 to transition management unit 110, which may then use this determination as one of its prerequisite criteria for enabling activation of ASPA-FIM mode (subsequent to applying transitional ASPA-FIM trajectory management requirements as described above).

As FIG. 2 further shows, after own aircraft 100 enters transition airspace 243, own aircraft 100 continues heading toward WP/MP 242 so that own aircraft 100 can merge into queue formation lined up behind target aircraft 160 and be ready to be in the appropriate heading for the queue when own aircraft 100 passes WP/MP 242. At the same time, in order for own aircraft 100 to also maintain the ASG distance from target aircraft 160 instead of allowing the spacing distance between the two aircraft to increase while own aircraft 100 follows merge trajectory 230, own aircraft 100 must quickly accelerate to a higher speed from its initial cruise speed. Own aircraft 100 may then maintain that higher speed while flying along merge trajectory 230, and then quickly decelerate to match the cruising speed of target aircraft 160 as own aircraft 100 lines up in queue formation directly behind target aircraft 160.

As also shown in FIG. 2 at Time 2, following aircraft 180 is following more distantly behind and along the same trajectory as target aircraft 160. However, own aircraft suddenly enters queue formation behind target aircraft 160 and then rapidly decelerates to match speeds with target aircraft 160 at the ASG distance, thereby also suddenly entering queue formation in front of following aircraft 180 at the same time as rapidly decelerating. This may also occur at approximately the same time that following aircraft 180 enters transition airspace 243. The sudden, rapid deceleration and merge into queue by own aircraft 100 ahead of following aircraft 180 may thus induce following aircraft 180 to have to suddenly, rapidly decelerate as well, and subsequently rapidly accelerate again to readjust to the proper speed and ASG distance for the queue formation.

Because own aircraft 100 may still be finishing decelerating from a higher speed than the speed of target aircraft 160 as own aircraft 100 merges into the queue, following aircraft 180 may have to both rapidly decelerate and then very soon rapidly accelerate again and overshoot past the queue formation speed before decelerating again at a more moderate rate. This in turn may induce sudden, rapid, oscillating decelerations, accelerations, and overshoots by subsequent following aircraft 182 and 184 as they each also react to restore the proper ASG distance with the respective aircraft in front of them and restore the proper queue formation speed, in a chain reaction that may in some cases increase in severity of speed change as the induced speed changes cascade through the merging queue, as further described below with reference to FIG. 3.

Figure 3:
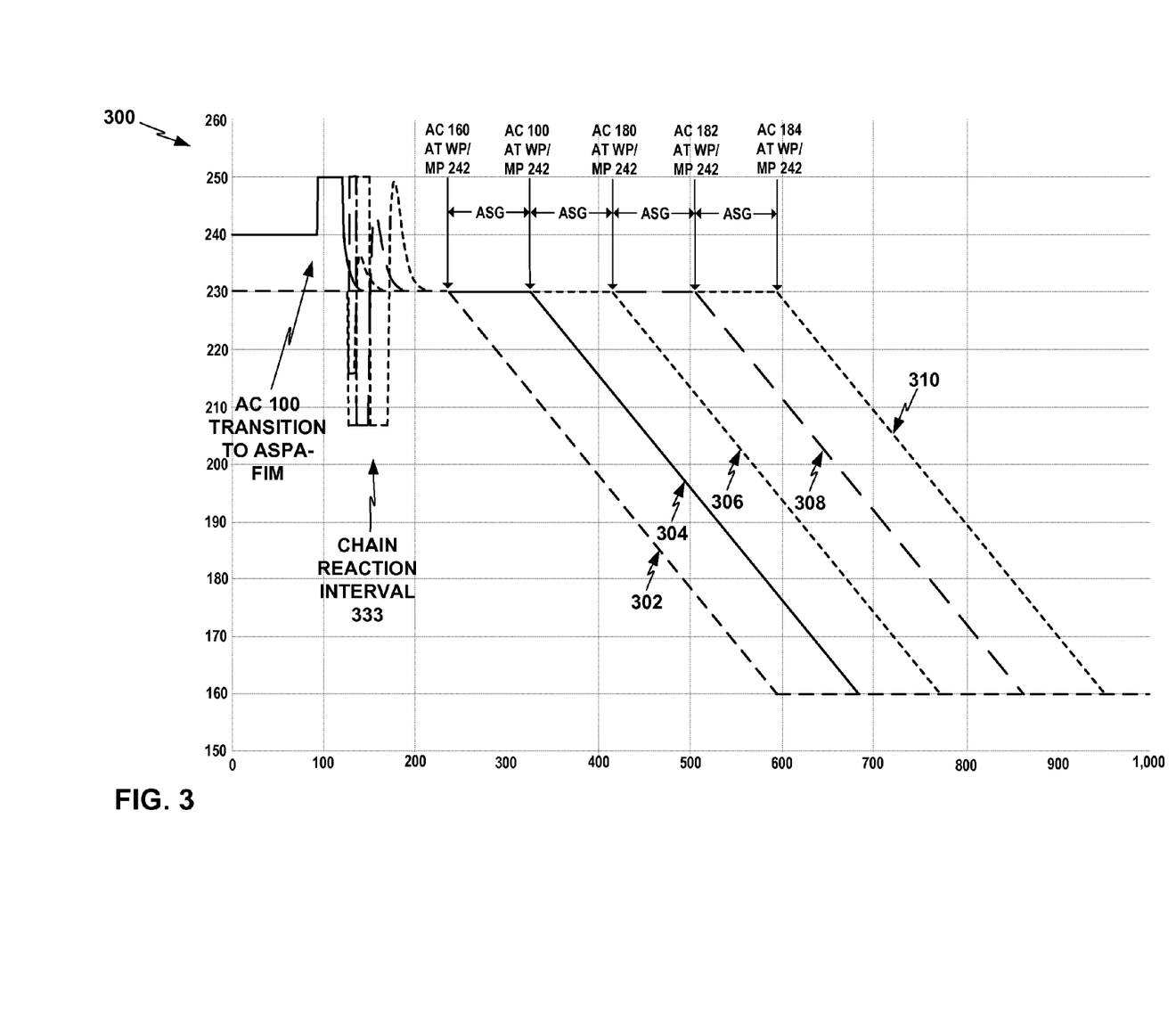
FIG. 3 shows a graph of an example speed change distribution over time of five aircraft merging into a queue as they transition from I4D to ASPA-FIM, without operation of mode transition unit, in order to contrast with the effects of a mode transition unit in some examples.

FIG. 3 shows a graph 300 of an example speed change distribution over time of five aircraft merging into a queue as they transition from I4D to ASPA-FIM, without operation of mode transition unit 110, in order to contrast with the effects of mode transition unit 110 in some examples. The five aircraft include target aircraft 160, own aircraft 100, and following aircraft 180, 182, and 184, which respectively exhibit speed distribution plots 302, 304, 306, 308, and 310. Target aircraft 160 and following aircraft 180, 182, and 184 all have an initial speed of 230 knots (kt) while own aircraft 100 has an initial speed of 240 kt, in this example. Each of the aircraft participates in a speed change chain reaction during chain reaction interval 333, but returns to or acquires a speed of 230 kt before reaching WP/MP 242. Each of the aircraft then begin a steady, moderate deceleration as they pass WP/MP 242, and later resume a constant speed at 160 kt, in this example.

Differences between I4D mode Required Times of Arrival (RTAs) of adjacent pairs of aircraft among those shown or referred to in FIGS. 1-3 (e.g., target aircraft 160 and own aircraft 100) may be set to be equivalent to Assigned Spacing Goal (ASG) distances in ASPA-FIM mode. However, the fact that difference between RTA values of adjacent pairs of aircraft (e.g., target aircraft 160 and own aircraft 100) are equal to the ASG does not necessarily mean that the spacing between the two aircraft has the ASG value when the two aircraft are still in cruise mode airspace, because I4D mode does not include requirements for spacing between aircraft. Instead, I4D mode controls the speed of an aircraft within allowed margins to meet the RTA value. On the other hand, ASPA-FIM mode aims both to match each aircraft's speed with the speed of the aircraft's respective forward adjacent aircraft (e.g., target aircraft 160 for own aircraft 100), and to maintain ASG with the respective forward adjacent aircraft.

This transition into seeking to fulfill merge mode requirements both to match speed and to maintain ASG with the respective forward adjacent aircraft, which may suddenly change as various aircraft merge from various directions and at various speeds into the forming queue formation, such as own aircraft 100 as described above, may induce the chain reaction acceleration oscillations depicted in chain reaction interval 333. Various aircraft may go through these acceleration oscillations to meet the merge mode requirements and pass through WP/MP 242 at the designated speed, heading, and ASG spacing for queue formation and in time intervals equal to the ASG divided by the designated speed.

Mode transition unit 110 may manage a transition between trajectory management modes from a cruise mode to a merge mode to manage a transition to go from conforming to the requirements of I4D mode to conforming to the requirements of ASPA-FIM mode while avoiding extraneous oscillations or variations in speed. For example, as own aircraft 100 progresses from a cruise trajectory management airspace (e.g., I4D airspace) to transition airspace 243 for transitioning to a merge trajectory management mode with requirements for spacing between multiple aircraft (e.g., ASPA-FIM), mode transition unit 110 on own aircraft 100 may: identify a target aircraft (e.g., target aircraft 160) ahead of the own aircraft 100; track the speed of the target aircraft over time; determine whether the target aircraft has stabilized its rate of change in speed for a selected period of time, according to stable deceleration criteria; and activate a merge trajectory management mode (e.g., ASPA-FIM mode) for own aircraft 100 in response to determining that the target aircraft has stabilized its rate of change in speed for the selected period of time.

Thus, mode transition unit 110 may trigger a transition of own aircraft 100 into the merge mode in response to detecting that two conditions are satisfied: that own aircraft 100 has passed into a trajectory management mode transition airspace 243, and that a target aircraft ahead of own aircraft 100 has stabilized its rate of change in speed (e.g., deceleration or relatively constant speed) for the selected period of time. In this context, mode transition unit 110 may determine that the rate of change in speed of the target aircraft is stabilized if the deceleration or change in speed of the target aircraft is within selected margins of a constant value over the selected period of time.

Figure 4:
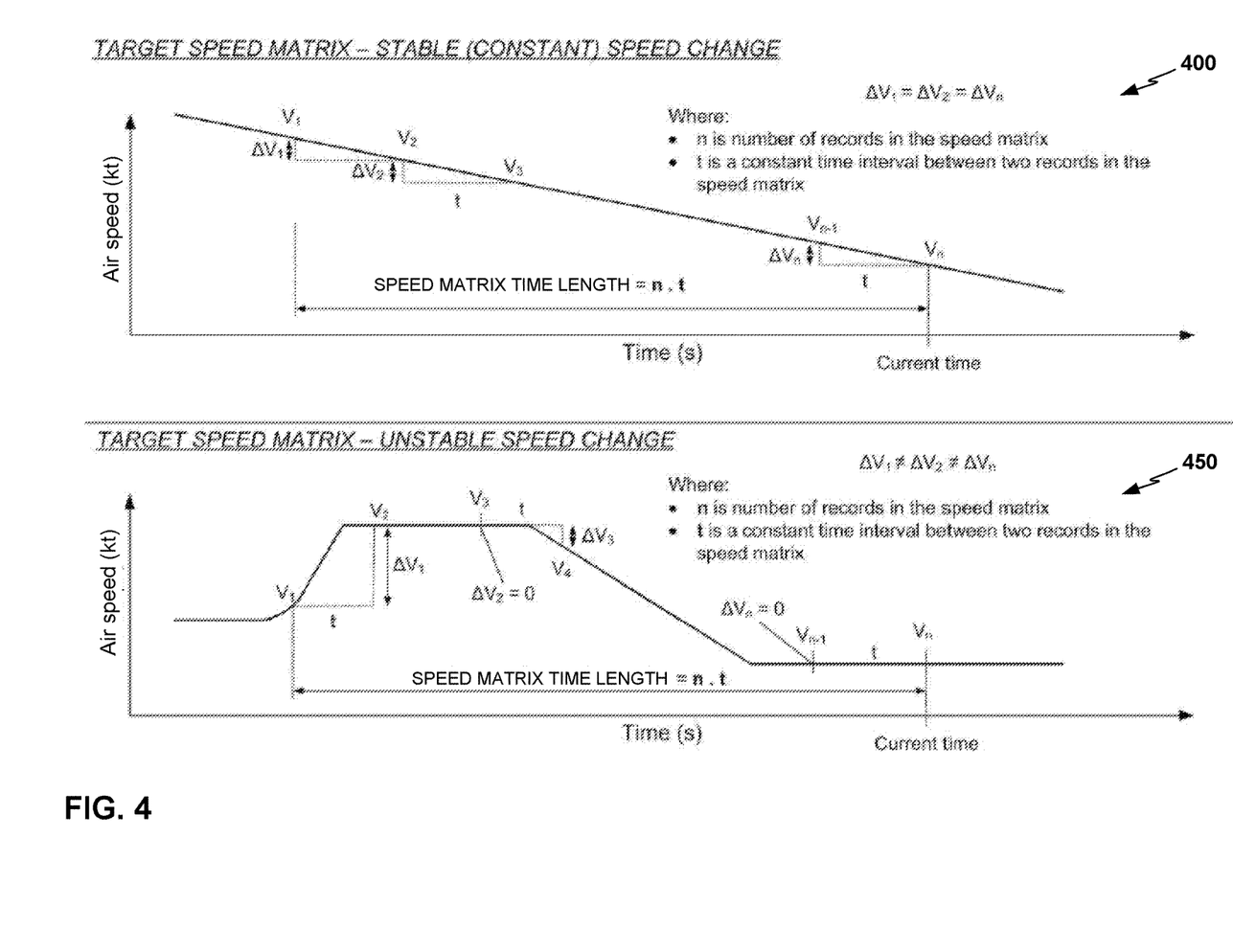
FIG. 4 shows a graph of a target speed matrix for an example stable rate of change in speed of target aircraft as determined by mode transition unit, and a graph of a target speed matrix for an example unstable rate of change in speed of target aircraft as determined by mode transition unit.

FIG. 4 shows a graph 400 of a target speed matrix for an example stable rate of change in speed of target aircraft 160 as determined by mode transition unit 110, and a graph 450 of a target speed matrix for an example unstable rate of change in speed of target aircraft 160 as determined by mode transition unit 110. If mode transition unit 110 determines that target aircraft 160 has a stable rate of change in speed as in graph 400, mode transition unit 110 may enable activation of ASPA-FIM mode, while if mode transition unit 110 determines that target aircraft 160 does not yet have a stable rate of change in speed, as in graph 450, mode transition unit 110 may refrain from enabling activation of ASPA-FIM mode, and instead may continue monitoring target aircraft 160 while own aircraft 100 continues in cruise mode and does not yet seek to apply a spacing requirement from target aircraft 160.

Mode transition unit 110 may store a selected margin of acceptable deviation from a constant rate of change in speed, such as plus or minus approximately five knots in one illustrative example from a target speed at a given point in time for a constant deceleration or constant speed, where a rate of change in speed that varies but only by an amount small enough to be within the selected margin may still be determined to be a stable rate of change in speed. The selected interval of variation in change of speed may be less than or equal to a variation of five knots above or below a constant value of deceleration, in some examples. The particular values of margin in change of speed may depend on the particular situation of a specific aircraft and a specific flight procedure, and may vary from less than just a few knots to tens of knots in different examples. Mode transition unit 110 may also store a selected interval of time such that mode transition unit 110 waits to determine if target aircraft 160 maintains a stable rate of change in speed for the selected interval of time, such as 60 seconds, for example. In other examples, the selected interval of time may be between 15 and 90 seconds, or within plus or minus five seconds of 60 seconds, for example. By enforcing a delay in enabling activation of ASPA-FIM mode and its spacing requirements, if necessary, until after mode transition unit 110 determines that target aircraft 160 is consistently settled in a constant rate of change in speed, mode transition unit 110 may dampen, reduce, or avoid extraneous or oscillating speed changes, and may avoid propagating extraneous speed changes back along the queue to the next following aircraft.

Figure 5:
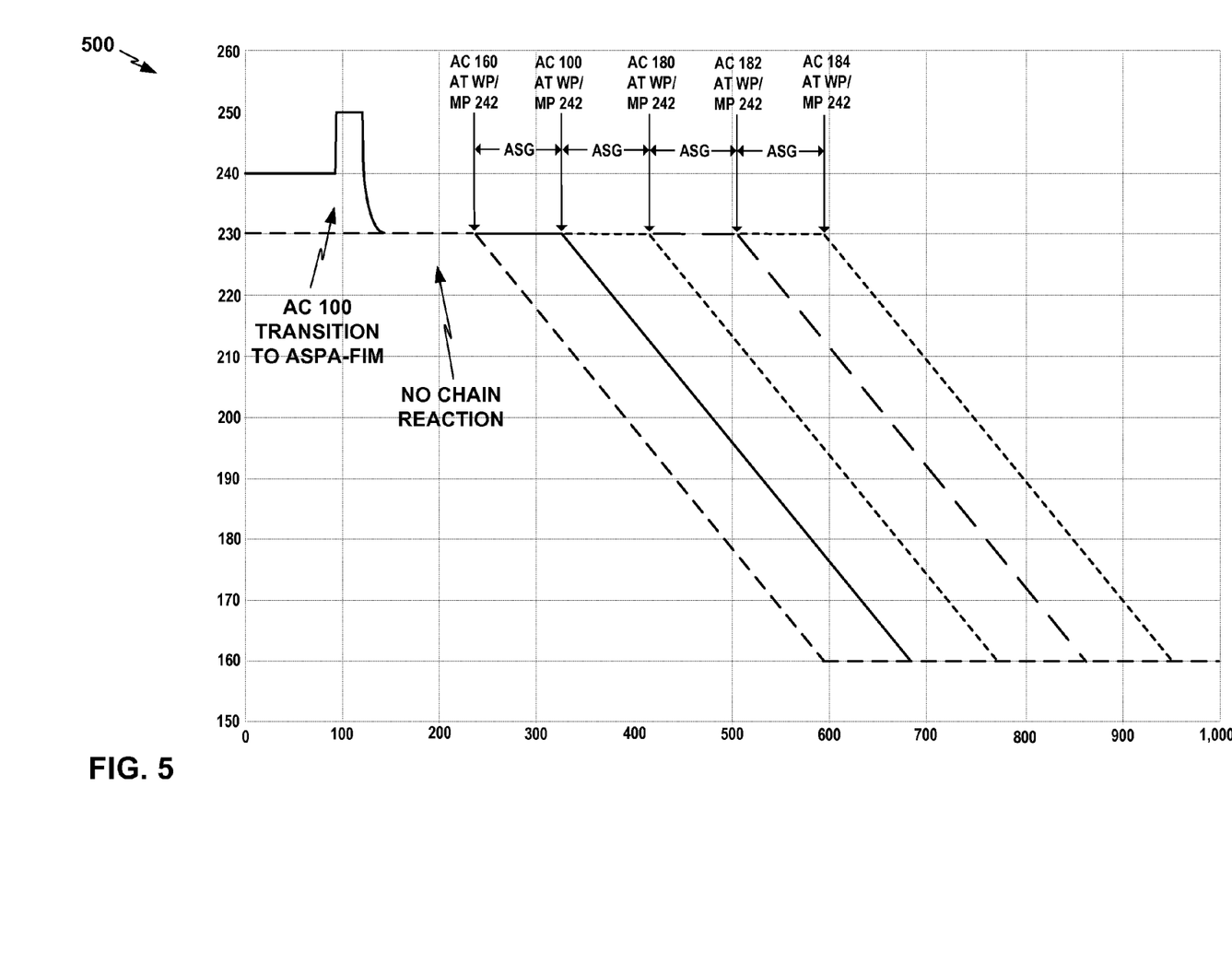
FIG. 5 shows a graph of speed changes of a target aircraft, own aircraft, and follower aircraft with the benefit of operation of a smart transition unit, in one example.

FIG. 5 shows a graph 500 of speed changes of target aircraft 160, own aircraft 100, and follower aircraft 180, 182, and 184 with the benefit of operation of mode transition unit 110, in one example. Graph 500 may thus be contrasted with graph 300 of FIG. 3. As shown in FIG. 5, mode transition unit 110 may ensure that none of the following aircraft react to the merging of own aircraft 100 with extraneous or oscillating speed changes, and the aircraft queue remains stable. When follower aircraft 180 equipped with a mode transition unit 110 enters the transition airspace while its forward adjacent aircraft, own aircraft 100, performs a rapid acceleration and then rapid deceleration to merge into the queue while maintaining ASG spacing, mode transition unit 110 on follower aircraft 180 may determine that own aircraft 100 is exhibiting an unstable rate of change in speed. Mode transition unit 110 on follower aircraft 180 may thus delay enabling activation of ASPA-FIM mode at first, and follower aircraft may instead continue flying in cruise mode, pursuant to the RTA WP speed criteria but without spacing criteria. Subsequently, mode transition unit 110 on follower aircraft 180 may determine when own aircraft 100 has settled into a stable rate of change in speed (e.g., a constant speed) for a selected period of time, and mode transition unit 110 may then enable activation of ASPA-FIM mode for follower aircraft 180. Enabling the activation of the ASPA-FIM mode or other merging trajectory management mode of the own aircraft may include outputting a merging trajectory management mode activation signal to FMS 120. Mode transition unit 110 may also deactivate the I4D mode.

Mode transition unit 110 may in some examples be implemented at least in part as a software package or software library comprising computer-executable instructions stored on and/or executed by traffic computer 102, as well as data stored and/or processed at least in part by traffic computer 102. Mode transition unit 110 may also be implemented in hardware or firmware in some examples. Own aircraft 100 and traffic computer 102 may also include various other systems and components beyond those shown in FIG. 1 and described above.

In any of the above examples, mode transition unit 110 may be implemented using executable software instructions. In some examples, mode transition unit 110 may be a portion of a larger set of executable software instructions which may be executed by processing hardware of traffic computer 102. Mode transition unit 110 may be implemented as portions of executable software instructions, and/or with embedded firmware and/or specialized hardware elements. In some examples, mode transition unit 110 of traffic computer 102 may be implemented with at least some functions implemented in embedded firmware, one or more graphical processing units (GPUs), one or more field programmable gate array (FPGAs), one or more application-specific integrated circuits (ASICs), or other specialized hardware.

Figure 6:
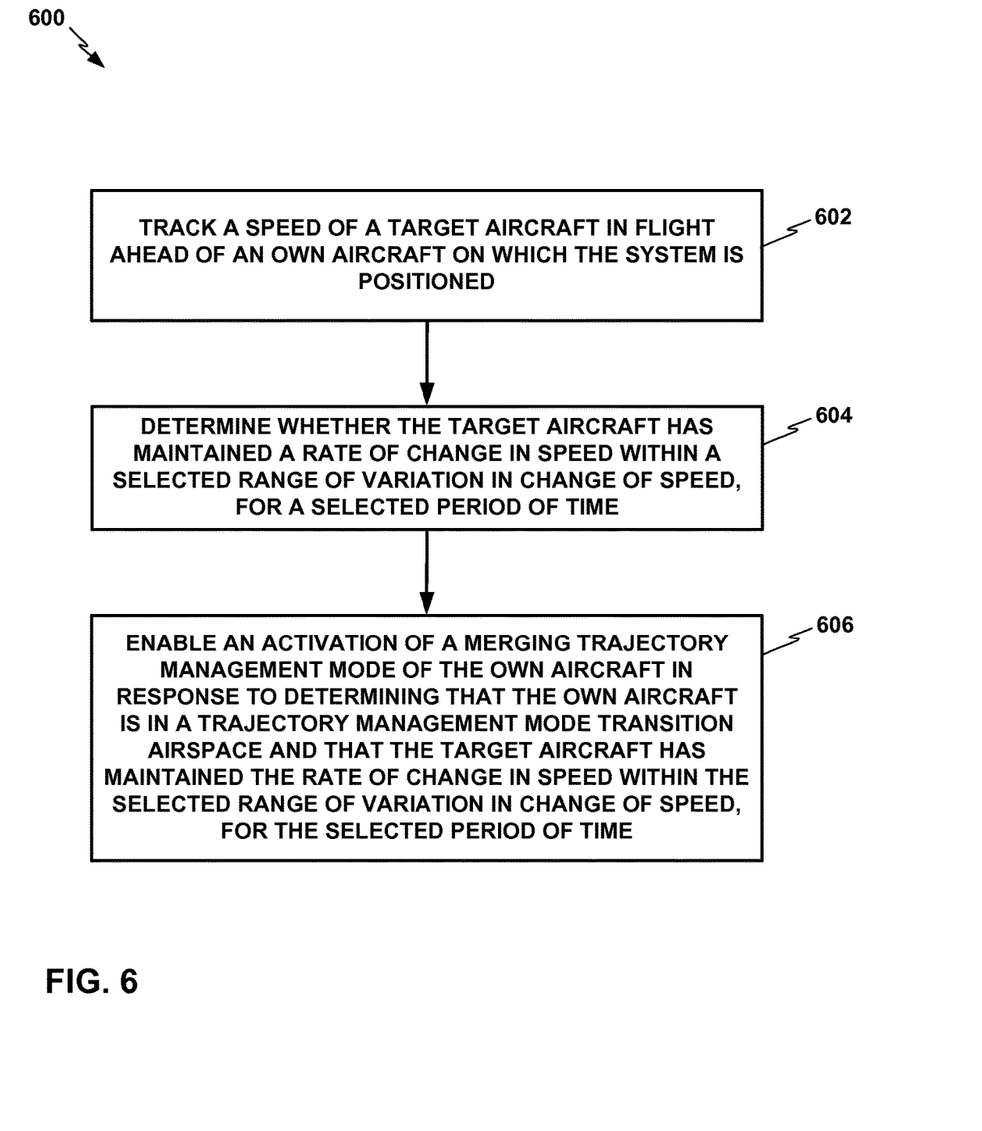
FIG. 6 shows a flowchart for a method that a traffic computer with mode transition unit, as shown in FIG. 1 and described above with reference to FIGS. 1-5, may perform in some examples.

FIG. 6 shows a flowchart for a method 600 that a traffic computer 102 with mode transition unit 110, as shown in FIG. 1 and described above with reference to FIGS. 1-5, may perform in some examples. Traffic computer 102 with mode transition unit 110 may track a speed of a target aircraft in flight ahead of an own aircraft on which the system is positioned (602). Traffic computer 102 may further determine whether the target aircraft has maintained a consistent change in speed, within a selected interval of variation in change of speed, for a selected period of time (604). Traffic computer 102 may further enable an activation of a queue merging flight trajectory management mode of the own aircraft in response to determining that the own aircraft is in a trajectory management mode transition airspace and that the target aircraft has maintained the consistent change in speed, within the selected interval of variation in change of speed, for the selected period of time (606).

A mode transition unit 110 as disclosed above may be implemented in any of a variety of additional types of circuit elements in addition to those described above, such as a magnetic nonvolatile random-access memory (RAM) or other types of memory, a mixed-signal integrated circuit, a central processing unit (CPU), a microcontroller, a programmable logic controller (PLC), a system on a chip (SoC), a subsection of any of the above, an interconnected or distributed combination of any of the above, or any other type of component or one or more components capable of being configured in accordance with any of the examples disclosed herein.

Various aspects of the disclosure have been described. These and other aspects are within the scope of the following claims.

What is claimed is:

1. A system comprising:
   one or more memory devices; and
   one or more processors operably coupled to the one or more memory devices, wherein the one or more processors are configured to:
   track a speed of a target aircraft in flight ahead of an own aircraft on which the system is positioned;

determine whether the target aircraft has maintained a rate of deceleration or acceleration within a selected range of variation in deceleration or acceleration, for a selected period of time; and enable an activation of a merging trajectory management mode of the own aircraft in response to determining that the own aircraft is in a trajectory management mode transition airspace and that the target aircraft has maintained the rate of deceleration or acceleration within the selected range of variation in deceleration or acceleration, for the selected period of time.

2. The system of claim 1, wherein the trajectory management mode transition airspace comprises an airspace designated for transitioning from a cruise trajectory management mode to the merging trajectory management mode on approach to an airport.

3. The system of claim 2, wherein the cruise trajectory management mode comprises Initial Four-Dimension (I4D) Trajectory Management mode.

4. The system of claim 1, wherein the merging trajectory management mode comprises Airborne Spacing-Flight Interval Management (ASPA-FIM) mode.

5. The system of claim 4, wherein determining that the own aircraft is in the trajectory management mode transition airspace comprises receiving an indication that the own aircraft is in the trajectory management mode transition airspace from an ASPA-FIM mode unit that manages the ASPA-FIM mode.

6. The system of claim 1, wherein enabling the activation of the merging trajectory management mode of the own aircraft comprises outputting a merging trajectory management mode activation signal to a Flight Management System (FMS) of the own aircraft.

7. The system of claim 1, wherein the one or more processors are further configured to deactivate the cruise trajectory management mode in response to determining that the own aircraft is in the trajectory management mode transition airspace and that the target aircraft has maintained the rate of deceleration or acceleration, within the selected interval of variation in deceleration or acceleration, for the selected period of time.

8. The system of claim 1, wherein the one or more processors are further configured to receive cooperative surveillance messages from the target aircraft, and to track the speed of the target aircraft based on the cooperative surveillance messages received from the target aircraft.

9. The system of claim 8, wherein the cooperative surveillance messages comprise automatic dependent surveillance-broadcast (ADS-B) messages, and the one or more processors are configured to track the speed of the target aircraft based on ADS-B messages received from the target aircraft.

10. The system of claim 1, wherein the selected period of time is between 15 and 90 seconds.

11. The system of claim 1, wherein the selected interval of variation in change of speed is less than or equal to a variation of five knots above or below a constant value of deceleration.

12. The system of claim 1, wherein the one or more processors are further configured to output a mode transition advisory to a cockpit display/input system (CDIS) of the own aircraft.

13. The system of claim 1, wherein the one or more processors are further configured to determine whether the target aircraft has maintained the rate of deceleration or acceleration within the selected range of variation in deceleration or acceleration for the selected period of time according to target aircraft speed change stability criteria based on speed matrix data for the target aircraft.

14. A method comprising:

tracking, by one or more processors, a speed of a target aircraft in flight ahead of an own aircraft on which the system is positioned;

determining, by the one or more processors, whether the target aircraft has maintained a rate of deceleration or acceleration within a selected range of variation in deceleration or acceleration, for a selected period of time;

enabling, by the one or more processors, an activation of a merging trajectory management mode of the own aircraft in response to determining that the own aircraft is in a trajectory management mode transition airspace and that the target aircraft has maintained the rate of deceleration or acceleration within the selected range of variation in deceleration or acceleration, for the selected period of time.

15. The method of claim 14, wherein the trajectory management mode transition airspace comprises an airspace designated for transitioning from a cruise trajectory management mode to the merging trajectory management mode on approach to an airport.

16. The method of claim 15, wherein the cruise trajectory management mode comprises Initial Four-Dimension (I4D) Trajectory Management mode.

17. The method of claim 14, wherein the merging trajectory management mode comprises Airborne Spacing-Flight Interval Management (ASPA-FIM) mode.

18. The method of claim 17, wherein determining that the own aircraft is in the trajectory management mode transition airspace comprises receiving an indication that the own aircraft is in the trajectory management mode transition airspace from an ASPA-FIM mode unit that manages the ASPA-FIM mode.

19. A non-transitory computer program product comprising executable instructions to cause one or more processors to:

track a speed of a target aircraft in flight ahead of an own aircraft on which the system is positioned;

determine whether the target aircraft has maintained a rate of deceleration or acceleration within a selected range of variation in deceleration or acceleration, for a selected period of time; and enable an activation of a merging trajectory management mode of the own aircraft in response to determining that the own aircraft is in a trajectory management mode transition airspace and that the target aircraft has maintained the rate of deceleration or acceleration within the selected range of variation in deceleration or acceleration, for the selected period of time.

20. The non-transitory computer program product of claim 19, wherein the trajectory management mode transition airspace comprises an airspace designated for transitioning from a cruise trajectory management mode to the merging trajectory management mode on approach to an airport, wherein the cruise trajectory management mode comprises Initial Four-Dimension (I4D) Trajectory Management mode, and wherein the merging trajectory management mode comprises Airborne Spacing-Flight Interval Management (ASPA-FIM) mode.

* * * * *